United States Patent
Ito et al.

(10) Patent No.: US 8,017,688 B2
(45) Date of Patent: Sep. 13, 2011

(54) CROSSLINKED POLYROTAXANE AND PROCESS FOR PRODUCING THE SAME

(75) Inventors: Kohzo Ito, Tokyo (JP); Masatoshi Kidowaki, Tokyo (JP)

(73) Assignee: The University of Tokyo, Tokyo (JP)

( * ) Notice: Subject to any disclaimer, the term of this patent is extended or adjusted under 35 U.S.C. 154(b) by 795 days.

(21) Appl. No.: 10/585,592

(22) PCT Filed: Jan. 11, 2005

(86) PCT No.: PCT/JP2005/000172
§ 371 (c)(1),
(2), (4) Date: Jun. 16, 2009

(87) PCT Pub. No.: WO2005/080470
PCT Pub. Date: Sep. 1, 2005

(65) Prior Publication Data
US 2009/0312491 A1    Dec. 17, 2009

(30) Foreign Application Priority Data
Jan. 8, 2004    (JP) .................................. 2004-003479

(51) Int. Cl.
*C08F 16/06* (2006.01)
(52) U.S. Cl. .................................................... 525/54.26
(58) Field of Classification Search ................ 525/54.26
See application file for complete search history.

(56) References Cited

U.S. PATENT DOCUMENTS
| | | | |
|---|---|---|---|
| 6,037,387 A | 3/2000 | Yui et al. | |
| 6,828,378 B2 | 12/2004 | Okumura et al. | |
| 2003/0124168 A1 | 7/2003 | Yui et al. | |

FOREIGN PATENT DOCUMENTS
| | | |
|---|---|---|
| JP | 9-301893 A | 11/1997 |
| JP | 2004-339497 A | 12/2004 |
| WO | WO 03/074099 A1 | 9/2003 |

OTHER PUBLICATIONS

Ichi, T., et al., "Preparation and Characterization of Three-Dimensional Architecture Based on Polyrotaxane Structure," Proceedings of the 12th Bioengineering Conference 1999 Annual Meeting of BED/JSME, Japan Society of Mechanical Engineers, Jan. 5, 2000, pp. 217-218.

Okumura, Y., and K. Ito, "The Polyrotaxane Gel: A Topological Gel by Figure-of-Eight Cross-Links," *Advanced Materials* 13(7):485-487, Apr. 4, 2001.

*Primary Examiner* — David W Wu
*Assistant Examiner* — Sonya Wright
(74) *Attorney, Agent, or Firm* — Christensen O'Connor Johnson Kindness PLLC

(57) ABSTRACT

A compound or material having safety, namely, biocompatibility that exhibits such a nongel-gel transition that the state of being nongel is presented on the side of low temperature while the state of being crosslinked, for example, gel is presented on the side of high temperature. There is provided a crosslinked polyrotaxane at least two molecules of polyrotaxane consisting of cyclodextrin molecules having a linear molecule included in a skewed manner in cavities thereof and having capping groups at each end of the linear molecule so as to prevent detachment of the cyclodextrin molecules, the above at least two molecules of polyrotaxane crosslinked with each other via physical bonds, characterized in that the hydroxyls (—OH) of the cyclodextrin molecules are partially or wholly substituted with non-ionic groups.

37 Claims, 2 Drawing Sheets

Unmodified Polyrotaxane:
Insoluble in Water due to CD Aggregation

⇩ CD modified with Non-ionic Group

Modified Polyrotaxane: Soluble in Water due to CD Dispersion

⇩ Heat Aqueous Solution

Physical Crosslink Formed by CD Aggregation

CROSSLINKED POLYROTAXANE AND PROCESS FOR PRODUCING THE SAME

TECHNICAL FIELD

The present invention relates to a crosslinked polyrotaxane comprising polyrotaxane molecules crosslinked with each other and a method of producing the same. In particular, the present invention relates to a crosslinked polyrotaxane comprising polyrotaxane molecules, wherein an OH group of a cyclodextrin molecule in the polyrotaxane is substituted with a non-ionic group, and the polyrotaxane molecules are crosslinked through physical bonding, to a method of producing the same, and to an external stimulus-responsive material comprising the crosslinked polyrotaxane.

BACKGROUND ART

There have been conventionally well known hydrogels exhibiting thermal reversibility such as agar and gelatin. The hydrogels show a sol state having fluidity by heating, and a gel state not having fluidity by cooling.

There have also been known compounds exhibiting reverse temperature characteristics from those of the hydrogels, or exhibiting a sol-gel transition in which a compound is in the sol state at low temperature and in the gel state at high temperature, including N,N-diisopropylacrylamide polymers, polypropylene glycol polymers and the like. These are expected to be applied for the fields of medicine and biotechnology, including cell culture carriers, wound dressing, bioadhesives and the like.

Patent Document 1: Japanese Patent Application Laid-Open No. 9-301893.

DISCLOSURE OF THE INVENTION

Problem to be Solved by the Invention

However, when applying a known compound exhibiting the sol-gel transition in which the compound is in the sol state at low temperature and in the gel state at high temperature to the fields of medicine, biotechnology and the like, there is a concern about its safety, namely, biocompatibility.

Accordingly, an object of the present invention is to provide a compound or material having safety, namely biocompatibility, and exhibiting a nongel-gel transition in which the compound or material is in a nongel state (e.g., a sol state, a liquid state, etc.) at low temperature and in a crosslinked state (e.g., a gel state) at high temperature.

In addition to, or other than the object above, an object of the present invention is to provide a compound or composition having a controllable nongel-gel transition point.

Means for Solving Problem

The present inventors have found that the problem above can be solved by a crosslinked polyrotaxane comprising at least two molecules of polyrotaxane, in which a linear molecule is included in cavities of cyclodextrin molecules in a skewered manner, wherein the linear molecule has at each end a capping group to prevent the dissociation of the cyclodextrin molecules, wherein the at least two molecules of polyrotaxane are crosslinked with each other through physical bonding.

Specifically, the present inventors have found that the problem described above can be solved by the present invention described below:

<1> A crosslinked polyrotaxane comprising at least two molecules of polyrotaxane, in which a linear molecule is included in cavities of cyclodextrin molecules in a skewered manner, wherein the linear molecule has at each end a capping group to prevent the dissociation of the cyclodextrin molecules, the at least two molecules of polyrotaxane are crosslinked with each other through physical bonding, and a part or all of hydroxyl groups (—OH) of the cyclodextrin molecules are substituted with a non-ionic group(s).

<2> A crosslinked polyrotaxane having a reversible ability to respond to external stimulus, which reversibly varies from an uncrosslinked state or crosslinked state to a crosslinked state or uncrosslinked state depending on the presence or absence of an external stimulus, comprising at least two molecules of polyrotaxane, in which a linear molecule is included in cavities of cyclodextrin molecules in a skewered manner, wherein the linear molecule has at each end a capping group to prevent the dissociation of the cyclodextrin molecules, the at least two molecules of polyrotaxane are crosslinked with each other through physical bonding, and a part or all of hydroxyl groups (—OH) of the cyclodextrin molecules are substituted with a non-ionic group(s).

<3> In the above item <2>, the external stimulus may be heat, and the crosslinked polyrotaxane may transform from the uncrosslinked state to a gel state as the crosslinked state in a first temperature range ranging from 5 to 90° C.

<4> In the above item <3>, the crosslinked polyrotaxane may transform from the gel state as the crosslinked state to the uncrosslinked state in a second temperature range, which is higher than the first temperature range, and which ranges from 10 to 100° C.

<5> In any one of the above items <1> to <4>, the non-ionic group may be a —OR group, and R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<6> In any one of the above items <1> to <4>, the non-ionic group may be a —O—R'—X group, and R' may be a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X may be OH, $NH_2$ or SH.

<7> In any one of the above items <1> to <4>, the non-ionic group may be a —O—CO—NH—$R_1$ group, and $R_1$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<8> In any one of the above items <1> to <4>, the non-ionic group may be a —O—CO—$R_2$ group, and $R_2$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<9> In any one of the above items <1> to <4>, the non-ionic group may be a —O—Si—$R_3$ group, and $R_3$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<10> In any one of the above items <1> to <4>, the non-ionic group may be a —O—CO—O—$R_4$ group, and $R_4$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<11> In any one of the above items <1> to <10>, substitution of the hydroxyl group with the non-ionic group may be 10 to 100%, preferably 20 to 100%, more preferably 30 to 100% of the total hydroxyl groups of the total cyclodextrin molecules.

<12> In any one of the above items <1> to <11>, the cyclodextrin molecule may be selected from the group consisting of α-cyclodextrin, β-cyclodextrin and γ-cyclodextrin.

<13> In any one of the above items <1> to <12>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<14> In any one of the above items <1> to <13>, the capping group may be selected from the group consisting of dinitrophenyl groups, cyclodextrins, adamantane groups, trityl groups, fluoresceins, pyrenes, substituted benzenes (examples of the substituent may include, but are not limited to, alkyl, alkyloxy, hydroxy, halogen, cyano, sulfonyl, carboxyl, amino, phenyl and the like. The substituent may be single or plural.), polycyclic aromatics which may be substituted (examples of the substituent may include, but are not limited to, those described above. The substituent may be single or plural.), and steroids. The capping group may be preferably selected from the group consisting of dinitrophenyl groups, cyclodextrins, adamantane groups, trityl groups, fluoresceins and pyrenes. The capping group may be more preferably adamantane groups or trityl groups.

<15> In any one of the above items <1> to <14>, the cyclodextrin molecule may be α-cyclodextrin, and the linear molecule may be polyethylene glycol.

<16> In any one of the above items <1> to <15>, the linear molecule may have the cyclodextrin molecules included in a skewered manner at an amount of 0.001 to 0.6, preferably 0.01 to 0.5, more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1.

<17> In any one of the above items <1> to <16>, a molecular weight of the linear molecule may be 10,000 or more, preferably 20,000 or more, more preferably 35,000 or more.

<18> A method for preparing a crosslinked polyrotaxane comprising the steps of:

1) mixing cyclodextrin molecules and a linear molecule, to prepare a pseudopolyrotaxane in which the linear molecule is included in cavities of the cyclodextrin molecules in a skewered manner;

2) capping each end of the pseudopolyrotaxane with a capping group to prevent the dissociation of the CD molecules, to prepare a polyrotaxane;

3) substituting a part of OH groups of the cyclodextrin molecules with a non-ionic group:

A) before the step 1) of mixing to prepare the pseudopolyrotaxane;

B) after the step 1) of mixing to prepare the pseudopolyrotaxane and before the step 2) of capping to prepare the polyrotaxane; and/or C) after the step 2) of capping to prepare the polyrotaxane;

4) dissolving at least two molecules of the resultant polyrotaxane in a hydrophilic solvent; and 5) applying an external stimulus to the molecules of the polyrotaxane in the hydrophilic solvent to crosslink the at least two molecules of the polyrotaxane through physical bonding.

<19> In the above item <18>, the external stimulus may be heat, and the molecules of polyrotaxane may transform from an uncrosslinked state to a hydrogel state as a crosslinked state in a first temperature range ranging from 5 to 90° C.

<20> In the above item <19>, the molecules of polyrotaxane may transform from the hydrogel state as the crosslinked state to the uncrosslinked state in a second temperature range, which is higher than the first temperature range, and which ranges from 10 to 100° C.

<21> In the step of dissolving of any one of the above items <18> to <20>, the polyrotaxane may be dissolved so that a weight ratio of the polyrotaxane to the hydrophilic solvent may be 0.1:99.9 to 70:30, preferably 1:99 to 50:50, more preferably 3:97 to 30:70.

<22> In any one of the above items <18> to <21>, the step of substituting may be set after the step 2) of capping to prepare the polyrotaxane.

<23> In any one of the above items <18> to <22>, the non-ionic group may be a —OR group, and R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<24> In any one of the above items <18> to <22>, the non-ionic group may be a —O—R'—X group, and R' may be a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X may be OH, $NH_2$ or SH.

<25> In any one of the above items <18> to <22>, the non-ionic group may be a —O—CO—NH—$R_1$, group, and $R_1$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<26> In any one of the above items <18> to <22>, the non-ionic group may be a —O—CO—$R_2$ group, and $R_2$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<27> In any one of the above items <18> to <22>, the non-ionic group may be a —O—Si—$R_3$ group, and $R_3$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<28> In any one of the above items <18> to <22>, the non-ionic group may be a —O—CO—O—$R_4$ group, and $R_4$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<29> In any one of the above items <18> to <28>, substitution of the hydroxyl group with the non-ionic group may be 10 to 100%, preferably 20 to 100%, more preferably 30 to 100% of the total hydroxyl groups of the total cyclodextrin molecules.

<30> In any one of the above items <18> to <29>, the cyclodextrin molecule may be selected from the group consisting of α-cyclodextrin, β-cyclodextrin and γ-cyclodextrin.

<31> In any one of the above items <18> to <30>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<32> In any one of the above items <18> to <31>, the capping group may be selected from the group consisting of dinitrophenyl groups, cyclodextrins, adamantane groups, trityl groups, fluoresceins, pyrenes, substituted benzenes (examples of the substituent may include, but are not limited to, alkyl, alkyloxy, hydroxy, halogen, cyano, sulfonyl, carboxyl, amino, phenyl and the like. The substituent may be single or plural.), polycyclic aromatics which may be substituted (examples of the substituent may include, but are not limited to, those described above. The substituent may be single or plural.), and steroids. The capping group may be preferably selected from the group consisting of dinitrophenyl groups, cyclodextrins, adamantane groups, trityl groups, fluoresceins and pyrenes. The capping group may be more preferably adamantane groups or trityl groups.

<33> In any one of the above items <18> to <32>, the cyclodextrin molecule may be α-cyclodextrin, and the linear molecule may be polyethylene glycol.

<34> In any one of the above items <18> to <33>, the linear molecule may have the cyclodextrin molecules included in a skewered manner at an amount of 0.001 to 0.6, preferably 0.01 to 0.5, more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1.

<35> In any one of the above items <18> to <34>, a molecular weight of the linear molecule may be 10,000 or more, preferably 20,000 or more, more preferably 35,000 or more.

<36> An external stimulus-responsive material having a reversible ability to respond to external stimulus, which reversibly varies from an uncrosslinked state or crosslinked state to a crosslinked state or uncrosslinked state depending on the presence or absence of an external stimulus, comprising a crosslinked polyrotaxane and a solvent, wherein the crosslinked polyrotaxane comprises at least two molecules of polyrotaxane, in which a linear molecule is included in cavities of cyclodextrin molecules in a skewered manner, wherein the linear molecule has at each end a capping group to prevent the dissociation of the cyclodextrin molecules, wherein the at least two molecules of polyrotaxane are crosslinked with each other through physical bonding, and a part or all of hydroxyl groups (—OH) of the cyclodextrin molecules are substituted with a non-ionic group(s).

<37> In the above item <36>, the external stimulus may be heat, the solvent may be water, and the material may transform from an uncrosslinked state to a crosslinked state, or crosslinked hydrogel state in a first temperature range ranging from 5 to 90° C.

<38> In the above item <37>, the material may transform from the crosslinked state, or crosslinked hydrogel state to the uncrosslinked state in a second temperature range, which is higher than the first temperature range, and which ranges from 10 to 100° C.

<39> In any one of the above items <36> to <38>, a weight ratio of the crosslinked polyrotaxane to the solvent may range from 0.1:99.9 to 70:30, preferably 1:99 to 50:50, more preferably 3:97 to 30:70.

<40> In any one of the above items <36> to <39>, the non-ionic group may be a —OR group, and R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<41> In any one of the above items <36> to <39>, the non-ionic group may be a —O—R'—X group, and R' may be a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X may be OH, $NH_2$ or SH.

<42> In any one of the above items <36> to <39>, the non-ionic group may be a —O—CO—NH—$R_1$, group, and $R_1$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<43> In any one of the above items <36> to <39>, the non-ionic group may be a —O—CO—$R_2$ group, and $R_2$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<44> In any one of the above items <36> to <39>, the non-ionic group may be a —O—Si—$R_3$ group, and $R_3$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<45> In any one of the above items <36> to <39>, the non-ionic group may be a —O—CO—O—$R_4$ group, and $R_4$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<46> In any one of the above items <36> to <45>, substitution of the hydroxyl group with the non-ionic group may be 10 to 100%, preferably 20 to 100%, more preferably 30 to 100% of the total hydroxyl groups of the total cyclodextrin molecules.

<47> In any one of the above items <36> to <46>, the cyclodextrin molecule may be selected from the group consisting of α-cyclodextrin, β-cyclodextrin and γ-cyclodextrin.

<48> In any one of the above items <36> to <47>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<49> In any one of the above items <36> to <48>, the capping group may be selected from the group consisting of dinitrophenyl groups, cyclodextrins, adamantane groups, trityl groups, fluoresceins, pyrenes, substituted benzenes (examples of the substituent may include, but are not limited to, alkyl, alkyloxy, hydroxy, halogen, cyano, sulfonyl, carboxyl, amino, phenyl and the like. The substituent may be single or plural.), polycyclic aromatics which may be substituted (examples of the substituent may include, but are not limited to, those described above. The substituent may be single or plural.), and steroids. The capping group may be preferably selected from the group consisting of dinitrophenyl groups, cyclodextrins, adamantane groups, trityl groups, fluoresceins and pyrenes. The capping group may be more preferably adamantane groups or trityl groups.

<50> In any one of the above items <36> to <49>, the cyclodextrin molecule may be α-cyclodextrin, and the linear molecule may be polyethylene glycol.

<51> In any one of the above items <36> to <50>, the linear molecule may have the cyclodextrin molecules included in a skewered manner at an amount of 0.001 to 0.6, preferably 0.01 to 0.5, more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1.

<52> In any one of the above items <36> to <51>, a molecular weight of the linear molecule may be 10,000 or more, preferably 20,000 or more, more preferably 35,000 or more.

EFFECTS OF THE INVENTION

The present invention can provide a compound or composition having safety, namely biocompatibility, and exhibiting a nongel-gel transition in which the compound or material is in a nongel state (e.g., a sol state, a liquid state, etc.) at low temperature and in a crosslinked state (e.g., a gel state) at high temperature.

In addition to, or other than the above-described effect, the present invention can provide a compound or material having a controllable nongel-gel transition point.

PREFERRED EMBODIMENTS FOR CARRYING OUT THE PRESENT INVENTION

The present invention will be described in detail hereinafter.

The crosslinked polyrotaxane of the present invention comprises at least two molecules of polyrotaxane crosslinked through physical bonding, wherein the molecule of polyrotaxane comprises CD molecules, in which a part or all of hydroxyl groups of the CD molecules are substituted with a non-ionic group(s).

It is thought, though not based on a perfect theory, that the present invention is achieved by the following action. The action is described with reference to FIG. 1. A polyrotaxane 101 comprising CDs 103 without a non-ionic substituent are insoluble in water, because the CDs 103 aggregate on a same linear molecule 105 due to interaction, especially hydrogen bondings between the CDs 103. However, a polyrotaxane 102 comprising CDs 104 with a non-ionic substituent(s) is water-soluble, because the CDs 104 are dispersed on the same linear molecule 106.

When an aqueous solution or sol of the water-soluble polyrotaxane 102 is heated, the CDs 104 aggregate on the same linear molecule 106 and between polyrotaxane molecules. Therefore, plural molecules of the polyrotaxane are physically crosslinked, and thereby to form a hydrogel 110.

The aqueous solution of the water-soluble polyrotaxane 102 or sol of the water-soluble polyrotaxane 102 and the hydrogel 110 are formed from each other reversibly by applying an external stimulus such as heating and cooling. Examples of the external stimulus, which depends on characteristics of a crosslinked polyrotaxane used, may include heat, pH, light including radioactive ray, sound wave and the like. In the present invention, "gelation" refers to a state in which a liquid loses its fluidity.

In the present invention, the phrase "reversibly varying from an uncrosslinked state or crosslinked state to a crosslinked state or uncrosslinked state depending on the presence or absence of an external stimulus" means both of a case of reversibly varying from an uncrosslinked state to a crosslinked state by alternation of an external stimulus, and vise versa, that is, a case of reversibly varying from a crosslinked state to an uncrosslinked state by alternation of an external stimulus.

In the present invention, the "crosslinked polyrotaxane crosslinked through physical bonding" includes those in a nanoparticle state having a particle diameter in a nanometer to micrometer order, in a micelle state, in an aggregate state and the like, as well as those in the gel state (e.g., in the hydrogel state).

In the crosslinked polyrotaxane according to the present invention, a non-ionic group with which a hydroxyl group in a CD molecule is substituted must be a group which prevents aggregation due to a hydrogen bonding between CD molecules. Specifically, the non-ionic group may be preferably a —OR group. R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons. Examples of R may include, but are not limited to, linear alkyl groups such as methyl, ethyl, propyl, butyl, pentyl, hexyl, heptyl, octyl, nonyl, decyl, undecyl, dodecyl and the like; a branched alkyl groups such as isopropyl, isobutyl, tert-butyl, 1-methylpropyl, isoamyl, neopentyl, 1,1-dimethylpropyl, 4-methylpentyl, 2-methylbutyl, 2-ethylhexyl and the like; cycloalkyl groups such as cyclopropyl, cyclobutyl, cyclopentyl, cyclohexyl, cycloheptyl, cyclooctyl, adamantyl and the like; cycloalkyl ether groups such as ethylene oxide, oxetane, tetrahydrofuran, tetrahydropyrane, oxepane, dioxane, dioxolane and the like; cycloalkyl thioether groups such as thiirane, thietane, tetrahydrothiophene, thiane, dithiolane, dithiane and the like. Among them, R may be preferably methyl, ethyl, propyl, butyl, pentyl or hexyl, and more preferably methyl, ethyl or propyl.

When polyrotaxane molecules are physically crosslinked, all of the polyrotaxane molecules may be substituted with the same non-ionic group. Alternatively, a part of the polyrotaxane molecules may be substituted with a non-ionic group A, and the rest of them may be substituted with a non-ionic group B (B is different from A). Moreover, different molecules of polyrotaxane substituted with different non-ionic groups may be physically crosslinked. Use of different molecules of polyrotaxane substituted with different non-ionic groups can control an ability to respond to external stimulus such as a non-gel-gel transition temperature.

Also, the non-ionic group may be a —O—R'—X group. R' may be a group resulting from removal of one hydrogen in R group, and X may be preferably OH, $NH_2$ or SH. R' is defined independently of R. R' may be a group resulting from removal of one hydrogen in methyl, ethyl, propyl, butyl, pentyl or hexyl, and more preferably a group resulting from removal of one hydrogen in methyl, ethyl or propyl. Preferably, X may be OH or $NH_2$, more preferably OH.

Further, the non-ionic group may be a —O—CO—NH—$R_1$, group, a —O—CO—$R_2$ group, a —O—Si—$R_3$ group or a —O—CO—O—$R_4$ group.

$R_1$, $R_2$, $R_3$ and $R_4$ may be, independently, a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

Substitution of the hydroxyl group with the non-ionic group may be 10 to 100%, preferably 20 to 100%, and more preferably 30 to 100% of the total hydroxyl groups of the total CD molecules included in the crosslinked polyrotaxane.

A CD molecule constructing the crosslinked polyrotaxane according to the present invention may be selected from the group consisting of α-CD, β-CD and γ-CD, and more preferably α-CD.

In the crosslinked polyrotaxane according to the present invention, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene, and preferably polyethylene glycol.

A molecular weight of the linear molecule may be 10,000 or more, preferably 20,000 or more, more preferably 35,000 or more. The upper limit of the molecular weight of the linear molecule is not specifically limited. A crosslinked polyrotaxane using a linear molecule having a molecular weight of at least 100,000 can be preferably used in the present invention.

In the crosslinked polyrotaxane according to the present invention, a bulky capping group used may be selected from the group consisting of dinitrophenyl groups, cyclodextrins, adamantane groups, trityl groups, fluoresceins and pyrenes, preferably selected from adamantane groups or trityl groups.

Other bulky capping groups may also be used. Examples of the other bulky capping group may include substituted benzene such as cresol (example of the substituent may include, but are not limited to, alkyl, alkyloxy, hydroxy, halogen, cyano, sulfonyl, carboxyl, amino, phenyl and the like. The substituent may be single or plural.); polycyclic aromatics, such as anthracene, which may be substituted (examples of the substituent include, but are not limited to, those described above. The substituent may be single or plural.); and steroids.

A combination of a CD molecule and a linear molecule in the crosslinked polyrotaxane according to the present invention may be α-CD as the CD molecule and polyethylene glycol as the linear molecule.

In the crosslinked polyrotaxane according to the present invention, the linear molecule may have the CD molecules included in a skewered manner at an amount of 0.001 to 0.6, preferably 0.01 to 0.5, and more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1. When an inclusion amount of CD molecules is too large, or CD molecules are closely packed along the linear molecule, a sliding mode function in which a CD molecule relatively shifts along the linear molecule cannot be sufficiently attained.

The present invention also provides an external stimulus-responsive material comprising the polyrotaxane and a solvent.

The solvent may be preferably a hydrophilic solvent, and more preferably water. The external stimulus-responsive material may be preferably prepared such that a weight ratio of the polyrotaxane to the hydrophilic solvent, especially water, is 0.1:99.9 to 70:30, preferably 1:99 to 50:50, more preferably 3:97 to 30:70.

The external stimulus may be heat. The external stimulus-responsive material may transform from an uncrosslinked state to a crosslinked state, or a physically crosslinked hydrogel state in the first temperature range ranging from 5 to 90° C. The external stimulus-responsive material of the present invention also includes those transforming from the hydrogel state to the uncrosslinked state in the second temperature range, which is higher than the first temperature range, and which ranges from 10 to 100° C.

The external stimulus-responsive material may comprise various ingredients in addition to the polyrotaxane and the solvent unless the ingredient blocks the ability to respond to the external stimulus. For example, when the external stimulus-responsive material according to the present invention is applied in the field of medicine or biotechnology, examples of the various ingredients include bioactive substances. Examples of the bioactive substance may include, but are not limited to, proteins and peptides such as collagen, gelatin, albumin, globulin, fibrinogen, insulin, glucagons and the like; polysaccharides such as starch, glycogen, hyaluronic acid, cellulose, heparin and the like; nucleic acids such as RNA, DNA and the like.

The crosslinked polyrotaxane according to the present invention can be prepared, for example, as follows: The crosslinked polyrotaxane according to the present invention can be prepared by the method comprising the steps of:

1) mixing cyclodextrin molecules and a linear molecule to prepare a pseudopolyrotaxane in which the linear molecule is included in cavities of the cyclodextrin molecules in a skewered manner;

2) capping each end of the pseudopolyrotaxane with a capping group to prevent the dissociation of the CD molecules to prepare a polyrotaxane;

3) substituting a part of OH groups of the cyclodextrin molecules with a non-ionic group:

A) before the step 1) of mixing to prepare the pseudopolyrotaxane;

B) after the step 1) of mixing to prepare the pseudopolyrotaxane and before the step 2) of capping to prepare the polyrotaxane; and/or C) after the step 2) of capping to prepare the polyrotaxane;

4) dissolving at least two molecules of the resultant polyrotaxane in a hydrophilic solvent; and 5) applying an external stimulus to the molecules of the polyrotaxane in the hydrophilic solvent to crosslink the at least two molecules of the polyrotaxane through physical bonding.

The step of substituting a part of OH groups of the cyclodextrin molecules with a non-ionic group may be set at any one of A) to C), or may be set at any two or more of A) to C).

In the preparation method described above, as the CD molecules, the linear molecule, the capping group and the like to be used, those described above may be used.

In the method, it is especially preferable that the external stimulus may be heat, and the external stimulus-responsive material may transform from an uncrosslinked state to a crosslinked state, or a physically crosslinked hydrogel state in the first temperature range ranging from 5 to 90° C. Preferably, the external stimulus-responsive material may also transform from the hydrogel state to the uncrosslinked state in the second temperature range, which is higher than the first temperature range, and which ranges from 15 to 100° C.

In the step of dissolving, a concentration of the polyrotaxane may be set to a specific value. The concentration, which depends on a kind of the non-ionic group, a substitution degree with the non-ionic group, an inclusion amount and the like, may be set such that, for example, a weight ratio of the polyrotaxane to the hydrophilic solvent, especially water, may be 0.1:99.9 to 70:30, preferably 1:99 to 50:50, more preferably 3:97 to 30:70.

In the method described above, the step of substituting may be set after the step 2) of capping to prepare the polyrotaxane.

Conditions used in the step of substituting, which depend on the non-ionic group, are not specifically limited, and various reaction methods and conditions may be employed. For example, when using the —OR group described above, or producing an ether bond, the following method may be employed: In general, a method of using an appropriate base as a catalyst together with a halide in a polar solvent such as dimethylsulfoxide and dimethylformamide is employed. As the base, alkaline such as sodium methoxide, sodium ethoxide, potassium t-butoxide, sodium hydroxide, potassium hydroxide, cesium hydroxide, lithium hydroxide, potassium carbonate, cesium carbonate, silver oxide, barium hydroxide, barium oxide, sodium hydride and potassium hydride; or alkaline earth metal salts can be used. There is also a method of introducing a leaving group such as p-toluenesulfonyl and methanesulfonyl and then substituting with an appropriate alcohol.

In addition to the method of introducing a —OR group as the non-ionic group by producing the ether bond, the following method may be employed: A method of producing a carbamate bond with an isocyanate compound or the like; a method of producing an ester bond with a carboxylate compound, an acid chloride, an acid anhydride or the like; a method of producing a silyl ether bond with a silane compound or the like; a method of producing a carbonate bond with a chlorocarboxylate compound; or the like.

The present invention will be illustrated more specifically by way of the following Examples, but is not limited thereby.

Example 1

Preparation of PEG-Carboxylic Acid via TEMPO Oxidation of PEG 10 g of PEG (molecular weight: 35, 000), 100 mg of TEMPO (2,2,6,6-tetramethyl-1-piperidinyloxy radical) and 1 g of sodium bromide were dissolved in 100 ml of water. To the resulting solution was added 5 ml of commercially available aqueous solution of sodium hypochlorite (effective chlorine concentration: approx. 5%), and reacted with stirring at room temperature. Immediately after adding sodium hypochlorite, a pH of the reaction mixture was rapidly decreased with the progress of the reaction, and was adjusted by adding 1N NaOH so that pH of the reaction was preferably kept at 10 to 11. Decrease of pH became scarcely observable within almost 3 minutes, and then the reaction mixture was stirred for 10 minutes. The reaction was quenched by adding ethanol with an amount of up to 5 ml. Ingredients other than inorganic salts were extracted with methylene chloride (50 ml) three times and methylene chloride was removed with an evaporator. The residue was dissolved in 250 ml of hot ethanol, and allowed to stand in a refrigerator at −4° C. overnight to precipitate a PEG-carboxylic acid, in which each end of the PEG was substituted with carboxylic acid (—COOH). The precipitated PEG-carboxylic acid was collected by centrifugation. The collected PEG-carboxylic acid was subjected to the procedure consisting of dissolving in hot ethanol, precipitating and centrifuging, for several times, and finally dried in vacuum, to give a purified PEG-carboxylic acid. Yield was 95% or more. A degree of carboxylation was 95% or more.

<Preparation of Pseudopolyrotaxane Using PEG-Carboxylic Acid and α-CD>

Each of 3 g of the PEG-carboxylic acid prepared above and 12 g of α-CD was dissolved in 50 ml of hot water at 70° C. These solutions were mixed, and allowed to stand in a refrigerator (4° C.) overnight. The precipitated inclusion complex in a pasty state was freeze-dried and collected. Yield was 90% or more (approx. 14 g).

<Preparation of Polyrotaxane Using Reaction Reagents of Adamantane Amine and a BOP Reagent>

3 g of BOP reagent (benzotriazol-1-yl-oxy-tris(dimethylamino)phosphonium hexafluorophosphate), 1 g of HOBt (1-hydroxy-1H-benzotriazole monohydrate), 1.4 g of adamantane amine and 1.25 ml of diisopropylethylamine were dissolved in 50 ml of dimethylformamide (DMF) in this order at room temperature. To the solution was added 14 g of the pseudopolyrotaxane obtained above and immediately shaken well at room temperature. The slurry mixture was allowed to stand in a refrigerator overnight. Then, to the mixture was added 50 ml of mixture of DMF/methanol=1:1, followed by mixing well, and then centrifuging. The supernatant was discarded. Washing with the DMF/methanol mixture was repeated twice, followed by washing with 100 ml of methanol and similar centrifuging twice. The resultant precipitate was dried in vacuum, dissolved in 50 ml of DMSO, to give a clear solution. The solution was dropped into 700 ml of water, and thereby to precipitate a polyrotaxane. The precipitated polyrotaxane was collected by centrifugation, and dried in vacuum or freeze-dried. The procedure consisting of dissolving in DMSO, precipitating in water, collecting and drying was repeated twice, and thereby finally to obtain a purified polyrotaxane. Yield based on the pseudopolyrotaxane added was approximately 65% (9.2 g was obtained from 14 g of the inclusion complex.)

<An Amount of α-CD in Polyrotaxane>

NMR measurement shows that approximately 111 molecules of α-CD are included in the polyrotaxane above, while the maximum inclusion amount of α-CD molecules at closest packing along the PEG used is found to be 398 from calculation. From the calculated value and the measured value of NMR, an amount of α-CD in the polyrotaxane used in the Example was found to be 0.28 of the maximum inclusion amount.

<Oxymethylation of α-CD>

5 g of the polyrotaxane prepared above was dissolved in 100 ml of dehydrated DMSO. To the mixture was added 1.7 g of sodium hydride (corresponding to 18 equivalents relative to 18 equivalents of hydroxyl groups of an α-CD molecule in the polyrotaxane). The resultant suspension was stirred for 3 hours. To the suspension was added 10 g of methyl iodide, followed by stirring for 20 hours, and then diluting with purified water to 300 ml of volume. The diluted mixture was dialyzed for 48 hours with a dialysis tube (fraction molecular weight: 12,000) in flowing tap water. The mixture was further dialyzed for 3 hours in 500 ml of purified water twice, and then freeze-dried to give a methylated polyrotaxane in which OH groups of an α-CD molecule is substituted with an OCH$_3$ group. Yield was 3.5 g.

$^1$H-NMR (CDCl$_3$, 300 MHz) δ (ppm) 3.0-4.2 (m, 14H), 4.8-5.2 (m, 1H).

In contrast to solubility of the starting polyrotaxane, which was soluble only in DMSO and insoluble in water, the methylated polyrotaxane obtained by chemical modification through α-CD was soluble in water, as well as DMSO, suggesting that formation of hydrogen bonding between α-CD molecules in the polyrotaxane is suppressed by the chemical modification.

The obtained polyrotaxane was dissolved in 0.5 ml of pure water so that a concentration thereof was 5 wt %. It was observed that the solution was clear and colorless at 5° C., and turned into opaque at room temperature. When the solution was heated higher, the solution was observed to gelate at 40° C. or higher. When the gel obtained by heating was cooled, it exhibits fluidity in an opaque state, and when further cooled to 5° C., it turned into a liquid in the same state as that of the solution before heating.

The polyrotaxane above was dissolved in pure water so that a concentration was 1 wt %. The resultant solution was observed for change of transmittance due to heating by using a visible light of wavelength 700 nm. The observation result is shown in FIG. 2. FIG. 2 shows that transmittance of the solution began to be decreased around 25° C., and was near 0% at 45° C. or higher, showing that since the polyrotaxane formed an aggregate by stimulus of heat, the polyrotaxane turned from a dissolved state to an undissolved state, and thereby the solution became opaque.

Example 2

Preparation of Peg-Carboxylic Acid Via TEMPO Oxidation of PEG 100 g of PEG (molecular weight: 35,000), 100 mg of TEMPO (2,2,6,6-tetramethyl-1-piperidinyloxy radical) and 2.5 g of sodium bromide were dissolved in 250 ml of water. To the resulting solution was added 25 ml of commercially available aqueous solution of sodium hypochlorite (effective chlorine concentration: approx. 5%), and reacted with stirring at room temperature. Immediately after adding sodium hypochlorite, a pH of the reaction mixture was rapidly decreased with the progress of the reaction, and was adjusted by adding 1N NaOH so that pH of the reaction was preferably kept at 10 to 11. The reaction was quenched by adding 25 ml of methanol. Ingredients other than inorganic salts were extracted with methylene chloride (400 ml) three times and methylene chloride was removed with an evaporator. The residue was dissolved in 3000 ml of hot ethanol, and allowed to stand in a refrigerator at −4° C. overnight to precipitate only a PEG-carboxylic acid. The precipitated PEG-carboxylic acid was collected by centrifugation. The collected PEG-carboxylic acid was subjected to the procedure consisting of dissolving in hot ethanol, precipitating and centrifuging for several times, and finally dried in vacuum to give a purified PEG-carboxylic acid. Yield was 95% or more. A degree of carboxylation was 95% or more.

<Preparation of Pseudopolyrotaxane Using PEG-Carboxylic Acid and α-CD>

Each of 19 g of the PEG-carboxylic acid prepared above and 67 g of α-CD was dissolved in 300 ml of hot water at 70° C. These solutions were mixed, and allowed to stand in a refrigerator (4° C.) overnight. The precipitated pseudopolyrotaxane in a pasty state was freeze-dried and collected.

<Preparation of Polyrotaxane Using Reaction Reagents of Adamantane Amine and a BOP Reagent>

0.6 g of BOP reagent (benzotriazol-1-yl-oxy-tris(dimethylamino)phosphonium hexafluorophosphate), 2.2 g of adamantane amine and 0.25 ml of diisopropylethylamine were dissolved in 200 ml of dimethylformamide (DMF) in this order at room temperature. To the solution was added the pseudopolyrotaxane obtained above and immediately shaken well at room temperature. The slurry mixture was allowed to stand in a refrigerator overnight. Then, to the mixture was added 200 ml of mixture of DMF/methanol=1:1, followed by mixing well, and centrifuging. The supernatant was discarded. Washing with the DMF/methanol mixture was repeated twice, followed by washing with 200 ml of methanol and similar centrifuging twice. The resultant precipitate was dried in vacuum, dissolved in 460 ml of DMSO, dropped into 4600 ml of water, and thereby a polyrotaxane was precipitated. The precipitated polyrotaxane was collected by centrifugation, and dried in vacuum or freeze-dried. The procedure consisting of dissolving in DMSO, precipitating in water, collecting and drying was repeated twice, and thereby a purified polyrotaxane was finally obtained. Yield was 44 g.

<An Amount of α-CD in Polyrotaxane>

NMR measurement showed that approximately 107 molecules of α-CD are included in the polyrotaxane above, while the maximum inclusion amount of α-CD molecules at closest packing along the PEG used is found to be 398 from calculation. From the calculated value and the measured value of NMR, an amount of α-CD in the polyrotaxane prepared in the present Example was found to be 0.27 of the maximum inclusion amount.

<Oxymethylation of α-CD>

5.0 g of the polyrotaxane prepared in Example 3 was dissolved in 100 ml of dehydrated DMSO. To the mixture was added 1.4 g of sodium hydride (corresponding to 14.4 equivalents relative to 18 equivalents of hydroxyl groups of an α-CD molecule in the polyrotaxane). The resultant suspension was stirred for 3 hours. To the suspension was added 8 g of methyl iodide, stirred for 20 hours, and then diluted with purified water to 200 ml of volume. The diluted mixture was dialyzed for 48 hours with a dialysis tube (fraction molecular weight: 12,000) in flowing tap water. The mixture was further dialyzed for 3 hours in 500 ml of purified water twice, and then freeze-dried to give a methylated polyrotaxane in which a part of OH groups of an α-CD molecule is substituted with an OCH$_3$ group. Yield was 4.3 g.

$^1$H-NMR (CDCl$_3$, 300 MHz) δ (ppm) 3.0-4.2 (m, 9H), 4.6-5.4 (m, 1H).

(Observation of Gelation)

The obtained polyrotaxane was dissolved in 0.5 ml of pure water so that a concentration thereof was 5 wt %. It was observed that the solution was clear and colorless at room temperature, turned into opaque by heating, and gelated at 60° C. or higher. Once the gel obtained by heating was cooled to room temperature, it turned into a solution in the same state as that of the solution before heating.

(Measurement of Transmittance Change)

A solution of the above polyrotaxane was observed for change of transmittance due to heating in a manner similar to Example 1. The observation result is shown in FIG. 2. FIG. 2 shows that transmittance of the solution was rapidly decreased around 55° C. and was 0% at 60° C. or higher, showing that since the polyrotaxane formed an aggregate by stimulus of heat, the polyrotaxane turned from a dissolved state to an undissolved state, and thereby the solution became opaque.

Example 3

Oxyethylation of α-CD 1.0 g of polyrotaxane prepared in a manner similar to Example 2 was dissolved in 20 ml of dehydrated DMSO. To the mixture was added 0.3 g of sodium hydride (corresponding to 14 equivalents relative to 18 equivalents of hydroxyl groups of an α-CD molecule in the polyrotaxane). The resultant suspension was stirred for 3 hours. To the suspension was added 1.4 g of ethyl bromide, stirred for 20 hours, and then diluted with purified water to 100 ml of volume. The diluted mixture was dialyzed for 48 hours with a dialysis tube (fraction molecular weight: 12,000) in flowing tap water. The mixture was further dialyzed for 6 hours in 1000 ml of purified water three times, and then freeze-dried to give an ethylated polyrotaxane in which a part of OH groups of an α-CD molecule is substituted with an $OCH_2CH_3$ group. Yield was 0.7 g.

$^1$H-NMR ($CDCl_3$, 300 MHz) δ (ppm) 1.0-1.4 (m, 3.2H), 3.0-4.4 (m, 7.2H), 4.6-5.2 (m, 1H).

In contrast to solubility of the starting polyrotaxane, which was soluble only in DMSO and insoluble in water, the ethylated polyrotaxane obtained by chemical modification through α-CD was soluble in water, as well as DMSO, suggesting that formation of hydrogen bonding between α-CD molecules in the polyrotaxane is suppressed by the chemical modification.

(Observation of Gelation)

The obtained polyrotaxane was dissolved in 0.5 ml of pure water so that a concentration thereof was 2 wt %. It was observed that the solution was clear and colorless at 5° C., and turned into opaque and gelated at 20° C. or higher. Once the gel obtained was cooled, it turned into a solution in the same state as that of the solution before heating.

Example 4

Oxy-n-propylcarbamoylation of α-CD 1.0 g of polyrotaxane prepared in a manner similar to Example 2 was dissolved in 10 ml of dehydrated DMSO. To the mixture were added 0.27 g of propylisocyanate (corresponding to 4 equivalents relative to 18 equivalents of OH groups of an α-CD molecule in the polyrotaxane) and 0.01 g of dibutyltin dilaurate. The resultant mixture was stirred for 20 hours, and then diluted with purified water to 100 ml of volume. The diluted mixture was dialyzed for 48 hours with a dialysis tube (fraction molecular weight: 12,000) in flowing tap water. The mixture was further dialyzed for 6 hours in 1000 ml of purified water three times, and then freeze-dried to give an n-propylcarbamoylated polyrotaxane in which a part of OH groups of an α-CD molecule is substituted with an O—CO—NH—$CH_2CH_2CH_3$ group. Yield was 1.2 g.

$^1$H-NMR (DMSO-$d_6$, 400 MHz) δ (ppm) 0.7-1.0 (m, 3H), 1.3-1.6 (m, 2H), 2.8-3.0 (m, 2H), 3.2-5.2 (m, 24H), 5.3-6.1 (m, 2H), 6.1-7.1 (m, 1H).

In contrast to solubility of the starting polyrotaxane, which was soluble only in DMSO and insoluble in water, the n-propylcarbamoylated polyrotaxane obtained by chemical modification through α-CD was soluble in water, as well as DMSO, suggesting that formation of hydrogen bonding between α-CD molecules in the polyrotaxane is suppressed by the chemical modification.

(Observation of Temperature Characteristics)

The obtained polyrotaxane was dissolved in 0.5 ml of pure water so that a concentration thereof was 5 wt %. It was observed that the solution was clear and colorless at 5° C., and turned into opaque and precipitated at 9.5° C. or higher. Once the gel obtained was cooled, it turned into a solution in the same state as that of the solution before heating.

Example 5

Acetylation of α-CD 0.5 g of polyrotaxane in a manner similar to Example 2 was dissolved in 5 ml of a mixed solvent of dehydrated DMSO: dehydrated pyridine=1:1. To the mixture were added 0.2 g of acetic anhydride and 0.02 g of 4-dimethylaminopyridine. The reaction mixture was stirred for 20 hours, and then diluted with purified water to 30 ml of volume. The diluted mixture was dialyzed for 24 hours with a dialysis tube (fraction molecular weight: 12,000) in flowing tap water. The mixture was further dialyzed for 24 hours in 5000 ml of purified water, and then freeze-dried to give an acetylated polyrotaxane in which a part of OH groups of an α-CD molecule is substituted with an —O—CO—$CH_3$ group. Yield was 0.5 g.

$^1$H-NMR (DMSO-$d_6$, 400 MHz) δ (ppm) 1.8-2.2 (m, 2.1H), 3.0-5.3 (m, 10H), 5.3-6.1 (m, 1H).

In contrast to solubility of the starting polyrotaxane, which was soluble only in DMSO and insoluble in water, the acetylated polyrotaxane obtained by chemical modification through α-CD was soluble in water at 10° C. or lower, as well as DMSO, suggesting that formation of hydrogen bonding between α-CD molecules in the polyrotaxane is suppressed by the chemical modification.

(Observation of Temperature Characteristics)

The obtained polyrotaxane was dissolved in 0.3 ml of pure water so that a concentration thereof was 3 wt %. It was observed that the solution was clear and colorless at 5° C., and turned into opaque and precipitated at room temperature. Once the gel obtained was cooled, it turned into a solution in the same state as that of the solution before heating.

Figure 1:
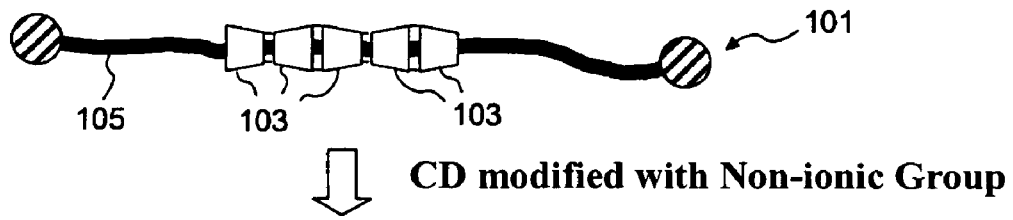
FIG. 1 illustrates a generation mechanism of the crosslinked polyrotaxane according to the present invention.
Figure 1:
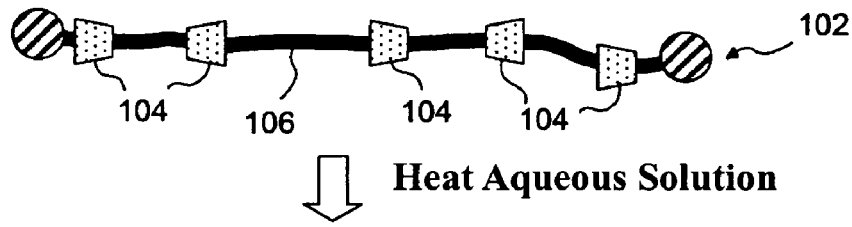
Figure 1:
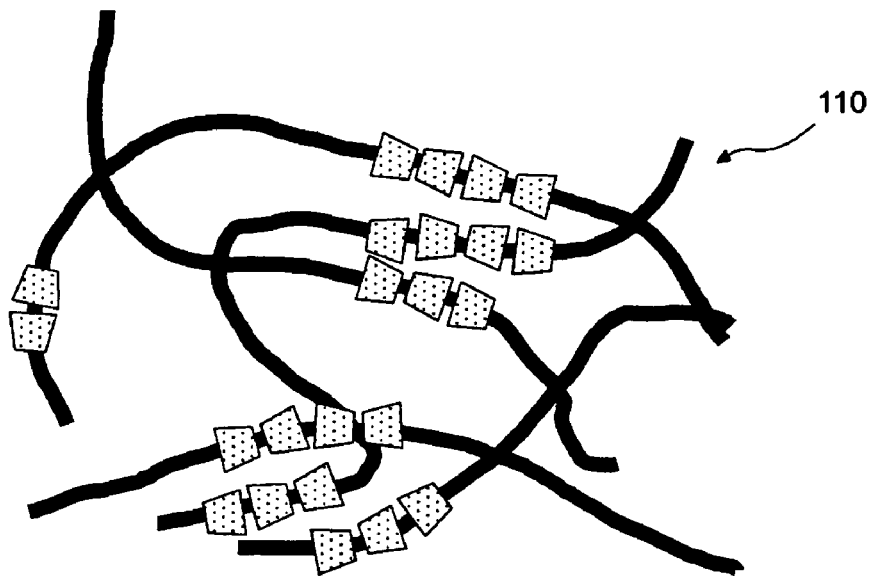
Figure 2:
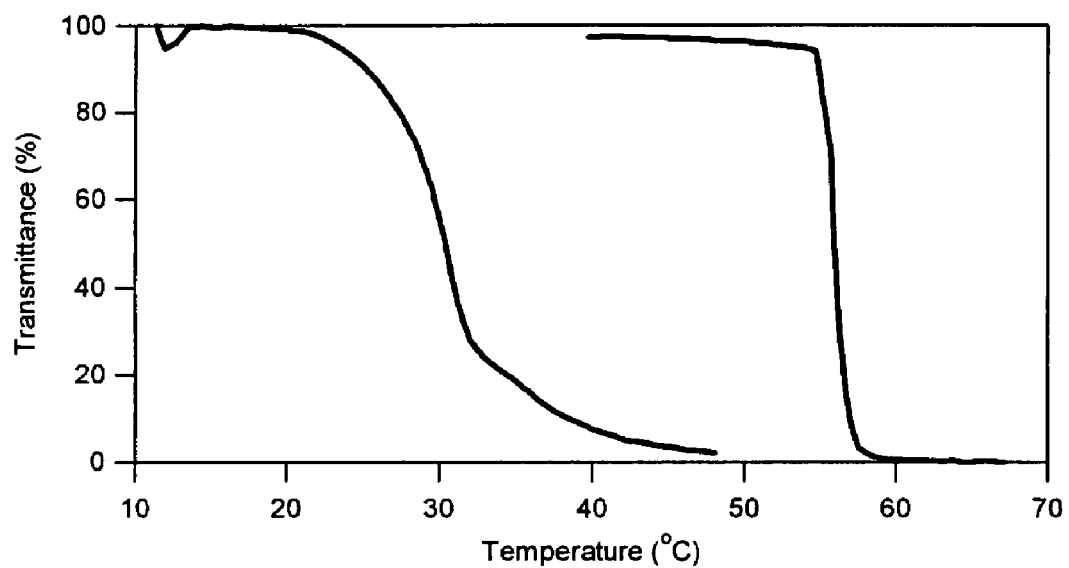
FIG. 2 shows each transmittance of polyrotaxane solutions (PR solutions) of Examples 1 and 2, which varies depending on temperature.

What is claimed is:

1. A crosslinked polyrotaxane comprising at least two molecules of polyrotaxane, in which a linear molecule is included in cavities of cyclodextrin molecules in a skewered manner, wherein the linear molecule has at each end a capping group to prevent the dissociation of the cyclodextrin molecules, the at least two molecules of polyrotaxane are crosslinked with each other through physical bonding, and a part or all of hydroxyl groups (—OH) of cyclodextrin molecules are substituted with a non-ionic group(s).

2. The crosslinked polyrotaxane according to claim 1, wherein the crosslinked polyrotaxane has a reversible ability to respond to external stimulus, which reversibly varies from an uncrosslinked state or crosslinked state to a crosslinked state or uncrosslinked state depending on the presence or absence of an external stimulus.

3. The crosslinked polyrotaxane according to claim 2, wherein the external stimulus is heat, and the crosslinked polyrotaxane transforms from the uncrosslinked state to a gel state as the crosslinked state in a first temperature range ranging from 5 to 90° C.

4. The crosslinked polyrotaxane according to claim 3, which transforms from the gel state as the crosslinked state to the uncrosslinked state in a second temperature range, which is higher than the first temperature range, and which ranges from 10 to 100° C.

5. The crosslinked polyrotaxane according to claim 1, wherein the non-ionic group is a —OR group, and R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

6. The crosslinked polyrotaxane according to claim 1, wherein the non-ionic group is a —O—R'—X group, and R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is OH, $NH_2$ or SH.

7. The crosslinked polyrotaxane according to claim 1, wherein the non-ionic group is a —O—CO—NH—$R_1$ group, and $R_1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

8. The crosslinked polyrotaxane according to claim 1, wherein the non-ionic group is a —O—CO—$R_2$ group, and $R_2$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

9. The crosslinked polyrotaxane according to claim 1, wherein the non-ionic group is a —O—Si—$R_3$ group, and $R_3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

10. The crosslinked polyrotaxane according to claim 1, wherein the non-ionic group is a —O—CO—O—$R_4$ group, and $R_4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

11. The crosslinked polyrotaxane according to claim 1, wherein substitution of the hydroxyl group with the non-ionic group is 10 to 100% of the total hydroxyl groups of the total cyclodextrin molecules.

12. The crosslinked polyrotaxane according to claim 1, wherein the cyclodextrin molecules are selected from the group consisting of α-cyclodextrin, β-cyclodextrin and γ-cyclodextrin.

13. The crosslinked polyrotaxane according to claim 1, wherein the linear molecule is selected from the group consisting of polyethylene glycol, polyisoprene, polyisobutylene, polybutadiene, polypropylene glycol, polytetrahydrofuran, polydimethylsiloxane, polyethylene and polypropylene.

14. The crosslinked polyrotaxane according to claim 1, wherein the capping group is selected from the group consisting of dinitrophenyl groups, cyclodextrins, adamantane groups, trityl groups, fluoresceins, pyrenes, substituted benzenes, polycyclic aromatics that may be substituted, and steroids.

15. The crosslinked polyrotaxane according to claim 1, wherein the cyclodextrin molecules are α-cyclodextrin, and the linear molecule is polyethylene glycol.

16. The crosslinked polyrotaxane according to claim 1, wherein the linear molecule has the cyclodextrin molecules included in a skewered manner at an amount of 0.001 to 0.6 of a maximum inclusion amount, which is defined as an amount at which the cyclodextrin molecule can be included at maximum when the linear molecule has the cyclodextrin molecules included in a skewered manner, and the amount at maximum is normalized to be 1.

17. A method for preparing a crosslinked polyrotaxane comprising the steps of:
1) mixing cyclodextrin molecules and a linear molecule, to prepare a pseudopolyrotaxane in which the linear molecule is included in cavities of the cyclodextrin molecules in a skewered manner;
2) capping each end of the pseudopolyrotaxane with a capping group to prevent the dissociation of the CD molecules, to prepare a polyrotaxane;
3) substituting a part of OH groups of the cyclodextrin molecules with a non-ionic group:
   A) before the step 1) of mixing to prepare the pseudopolyrotaxane;
   B) after the step 1) of mixing to prepare the pseudopolyrotaxane and before the step 2) of capping to prepare the polyrotaxane; and/or
   C) after the step 2) of capping to prepare the polyrotaxane;
4) dissolving at least two molecules of the resultant polyrotaxane in a hydrophilic solvent; and
5) applying an external stimulus to the molecules of the polyrotaxane in the hydrophilic solvent to crosslink the at least two molecules of the polyrotaxane through physical bonding.

18. The method according to claim 17, wherein the external stimulus is heat, and the molecules of polyrotaxane transforms from an uncrosslinked state to a hydrogel state as a crosslinked state in a first temperature range ranging from 5 to 90° C.

19. The method according to claim 18, wherein the molecules of polyrotaxane transforms from the hydrogel state as the crosslinked state to the uncrosslinked state in a second temperature range, which is higher than the first temperature range, and which ranges from 10 to 100° C.

20. The method according to claim 17, wherein the polyrotaxane is dissolved so that a weight ratio of the polyrotaxane to the hydrophilic solvent is 0.1:99.9 to 70:30 in the step of dissolving.

21. The method according to claim 17, wherein the step of substituting is set after the step 2) of capping to prepare the polyrotaxane.

22. An external stimulus-responsive material having a reversible ability to respond to external stimulus, which reversibly varies from an uncrosslinked state or crosslinked state to a crosslinked state or uncrosslinked state depending on the presence or absence of an external stimulus, comprising the crosslinked polyrotaxane according to claim 1 and a solvent.

23. The material according to claim 22, wherein the external stimulus is heat, the solvent is water, and the material transforms from an uncrosslinked state to a crosslinked state, or crosslinked hydrogel state in a first temperature range ranging from 5 to 90° C.

24. The material according to claim 23, wherein the material transforms from the crosslinked state, or crosslinked hydrogel state to the uncrosslinked state in a second temperature range, which is higher than the first temperature range, and which ranges from 10 to 100° C.

25. The material according to claim 22, wherein a weight ratio of the crosslinked polyrotaxane to the solvent ranges from 0.1:99.9 to 70:30.

26. The material according to claim 22, wherein the non-ionic group is a —OR group, and R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

27. The material according to claim 22, wherein the non-ionic group is a —O—R'—X group, and R is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is OH, $NH_2$ or SH.

28. The material according to claim 22, wherein the non-ionic group is a —O—CO—NH—$R_1$ group, and $R_1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

29. The material according to claim 22, wherein the non-ionic group is a —O—CO—$R_2$ group, and $R_2$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

30. The material according to claim 22, wherein the non-ionic group is a —O—Si—$R_3$ group, and $R_3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

31. The material according to claim 22, wherein the non-ionic group is a —O—CO—O—$R_4$ group, and $R_4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

32. The material according to claim 22, wherein substitution of the hydroxyl group with the non-ionic group is 10 to 100% of the total hydroxyl groups of the total cyclodextrin molecules.

33. The material according to claim 22, wherein the cyclodextrin molecules are selected from the group consisting of α-cyclodextrin, β-cyclodextrin and γ-cyclodextrin.

34. The material according to claim 22, wherein the linear molecule is selected from the group consisting of polyethylene glycol, polyisoprene, polyisobutylene, polybutadiene, polypropylene glycol, polytetrahydrofuran, polydimethylsiloxane, polyethylene and polypropylene.

35. The material according to claim 22, wherein the capping group is selected from the group consisting of dinitrophenyl groups, cyclodextrins, adamantane groups, trityl groups, fluoresceins, pyrenes, substituted benzenes, polycyclic aromatics that may be substituted, and steroids.

36. The material according to claim 22, wherein the cyclodextrin molecule is α-cyclodextrin, and the linear molecules are polyethylene glycol.

37. The material according to claim 22, wherein the linear molecule has the cyclodextrin molecules included in a skewered manner at an amount of 0.001 to 0.6 of a maximum inclusion amount, which is defined as an amount at which the cyclodextrin molecule can be included at maximum when the linear molecule has the cyclodextrin molecules included in a skewered manner, and the amount at maximum is normalized to be 1.

* * * * *

UNITED STATES PATENT AND TRADEMARK OFFICE
CERTIFICATE OF CORRECTION

PATENT NO. : 8,017,688 B2
APPLICATION NO. : 10/585592
DATED : September 13, 2011
INVENTOR(S) : K. Ito et al.

Page 1 of 1

It is certified that error appears in the above-identified patent and that said Letters Patent is hereby corrected as shown below:

| COLUMN | LINE | ERROR |
|---|---|---|
| 17 | 20 | "and R is a group" should read |
| (Claim 27, | line 2) | --and R' is a group-- |

Signed and Sealed this
Twenty-eighth Day of August, 2012

David J. Kappos
*Director of the United States Patent and Trademark Office*